(12) United States Patent
Alward et al.

(10) Patent No.: US 8,452,978 B2
(45) Date of Patent: *May 28, 2013

(54) SYSTEM AND METHOD FOR USER AUTHENTICATION AND DYNAMIC USABILITY OF TOUCH-SCREEN DEVICES

(75) Inventors: Herbert Lewis Alward, Coeur d' Alene, ID (US); Timothy Erickson Meehan, Richland, WA (US); James Joseph Straub, III, Coeur d' Alene, ID (US); Norman Carr, West Richland, WA (US); Robert Michael Hust, Hayden, ID (US)

(73) Assignee: Identity Metrics, LLC, Arlington, VA (US)

( * ) Notice: Subject to any disclaimer, the term of this patent is extended or adjusted under 35 U.S.C. 154(b) by 1264 days.

This patent is subject to a terminal disclaimer.

(21) Appl. No.: 11/901,454

(22) Filed: Sep. 17, 2007

(65) Prior Publication Data

US 2008/0092245 A1 Apr. 17, 2008

Related U.S. Application Data

(60) Provisional application No. 60/844,917, filed on Sep. 15, 2006, provisional application No. 60/846,690, filed on Sep. 22, 2006.

(51) Int. Cl.
| | |
|---|---|
| G06F 7/04 | (2006.01) |
| G06F 15/16 | (2006.01) |
| G06F 17/30 | (2006.01) |
| G06F 12/00 | (2006.01) |
| G06F 12/14 | (2006.01) |
| G06F 13/00 | (2006.01) |
| G06F 21/00 | (2006.01) |
| H04L 29/06 | (2006.01) |
| G11C 7/00 | (2006.01) |

(52) U.S. Cl.
USPC .............. 713/185; 726/5; 726/7; 726/19

(58) Field of Classification Search
USPC ............................. 726/28; 713/186
See application file for complete search history.

(56) References Cited

U.S. PATENT DOCUMENTS

| | | | |
|---|---|---|---|
| 4,621,334 | A | 11/1986 | Garcia |
| 4,805,222 | A | 2/1989 | Young et al. |
| 5,343,529 | A | 8/1994 | Goldfine et al. |
| 5,386,103 | A | 1/1995 | DeBan et al. |
| 5,870,723 | A | 2/1999 | Pare, Jr. et al. |

(Continued)

FOREIGN PATENT DOCUMENTS

EP 1255392 11/2002

OTHER PUBLICATIONS

"SecurID Token", http://www.is.mcgill.ca/minerva/Security/securid_token.htm, (Jun. 3, 2003).

(Continued)

*Primary Examiner* — Carolyn B Kosowski
(74) *Attorney, Agent, or Firm* — Tsircou Law, P.C.

(57) ABSTRACT

A system and related method are provided for user authentication and dynamic usability of touch-screen devices. The system utilizes probability distribution representations including an authorized user probability distribution representation and a global or wide population probability distribution representation, to associate the purported authorized user to the authorized user. Touch dynamics or data, or other data from similar measurable characteristics, can be utilized to associate the purported authorized user and the authorized user and to determine optimal positions and sizes for user interface components.

18 Claims, 11 Drawing Sheets

U.S. PATENT DOCUMENTS

| | | | |
|---|---|---|---|
| 5,974,162 A * | 10/1999 | Metz et al. | 382/124 |
| 6,006,188 A | 12/1999 | Bogdashevsky et al. | |
| 6,012,052 A * | 1/2000 | Altschuler et al. | 1/1 |
| 6,151,593 A | 11/2000 | Cho et al. | |
| 6,173,260 B1 | 1/2001 | Slaney | |
| 6,298,348 B1 | 10/2001 | Eldering | |
| 6,311,272 B1 * | 10/2001 | Gressel | 713/186 |
| 6,429,927 B1 * | 8/2002 | Borza | 356/71 |
| 6,442,692 B1 | 8/2002 | Zilberman | |
| 6,487,662 B1 * | 11/2002 | Kharon et al. | 713/186 |
| 6,553,494 B1 | 4/2003 | Glass | |
| 6,810,480 B1 * | 10/2004 | Parker et al. | 713/186 |
| 6,938,159 B1 | 8/2005 | O'Connor et al. | |
| 6,957,185 B1 | 10/2005 | Labaton | |
| 6,983,061 B2 * | 1/2006 | Ikegami et al. | 382/115 |
| 7,130,452 B2 * | 10/2006 | Bolle et al. | 382/115 |
| 7,133,792 B2 * | 11/2006 | Murakami et al. | 702/104 |
| 7,206,938 B2 * | 4/2007 | Bender et al. | 713/186 |
| 7,245,218 B2 | 7/2007 | Ikehara et al. | |
| 7,249,263 B2 | 7/2007 | Chaudhari et al. | |
| 7,327,859 B1 * | 2/2008 | Chau et al. | 382/116 |
| 7,370,208 B2 * | 5/2008 | Levin et al. | 713/182 |
| 7,494,061 B2 * | 2/2009 | Reinhold | 235/382 |
| 7,565,548 B2 * | 7/2009 | Fiske et al. | 713/186 |
| 7,818,290 B2 * | 10/2010 | Davis et al. | 707/603 |
| 8,051,468 B2 * | 11/2011 | Davis et al. | 726/5 |
| 8,161,530 B2 * | 4/2012 | Meehan et al. | 726/4 |
| 2001/0004733 A1 | 6/2001 | Eldering | |
| 2002/0095586 A1 | 7/2002 | Doyle et al. | |
| 2002/0112171 A1 | 8/2002 | Ginter et al. | |
| 2002/0129368 A1 | 9/2002 | Schlack et al. | |
| 2002/0174347 A1 * | 11/2002 | Ting | 713/186 |
| 2003/0065595 A1 | 4/2003 | Anglum | |
| 2003/0074201 A1 | 4/2003 | Grashey et al. | |
| 2004/0015714 A1 | 1/2004 | Abraham et al. | |
| 2004/0034558 A1 | 2/2004 | Eskandari | |
| 2005/0008148 A1 | 1/2005 | Jacobson | |
| 2006/0104484 A1 * | 5/2006 | Bolle et al. | 382/115 |
| 2006/0104486 A1 * | 5/2006 | Le Saint et al. | 382/115 |
| 2006/0195328 A1 * | 8/2006 | Abraham et al. | 705/2 |
| 2006/0206724 A1 * | 9/2006 | Schaufele et al. | 713/186 |
| 2006/0224898 A1 * | 10/2006 | Ahmed | 713/186 |
| 2006/0288234 A1 * | 12/2006 | Azar et al. | 713/186 |
| 2007/0005988 A1 * | 1/2007 | Zhang et al. | 713/186 |
| 2007/0011039 A1 * | 1/2007 | Oddo | 705/10 |
| 2007/0036395 A1 * | 2/2007 | Okun | 382/115 |
| 2007/0245157 A1 * | 10/2007 | Giobbi et al. | 713/186 |
| 2008/0092245 A1 * | 4/2008 | Alward et al. | 726/28 |
| 2008/0104415 A1 * | 5/2008 | Palti-Wasserman et al. | 713/186 |

OTHER PUBLICATIONS

"Baye's Theorem - Wikipedia", http://web.archive.orglweb/20031204023001/http://en.wikipedia.orglwikilBayes'_theorem.

Bandi, K.R. and Srihari, S.N. "Writer Demographic Classification Using Bagging and Boosting", Proc. International Graphonomics Society Conference (IGS), Jun. 2005, Salerno, Italy, pp. 133-137.

Body for Electronic Signatures Uniform Electronic Transactions Act (UETA), 1999.

Cottrell, G.W. and Metcalfe, J. "EMPATH: Face, Emotion, and Gender Recognition using Holons", Proc. 1990 Conf. Advances Neural Information Processing Systems, 1990, Denver, Colorado, pp. 564-571.

Golomb, B.A.; Lawrence, D.T.; and Sejnowski, T.J. "SexNet: A Neural Network Identifies Sex from Human Faces", Proc. 1990 Conf. Advances Neural Information Processing Systems, 1990, Denver, Colorado, pp. 572-577.

Gunetti, D. et al.; "Keystroke Analysis of Free Text" ACM Transactions on Nformation and System Security, vol. 8, Aug. 2005, pp. 312-347.

Han, J.Y.; "Low-Cost Multi-Touch Sensing through Frustrated Total Internal Reflection" UIST '05, Oct. 2005, Seattle, ACM, pp. 115-118.

Henniger, O.; Schneider, B.; Struif, B.; and Waldmann, U. "Improving the Binding of Electronic Signatures to the Signer by Biometric Authentication", Advances in Biometrics: International Conference, Hong Kong, China, 2006, pp. 523-530.

Lu, X.; Chen, H.; and Jain, A. K. "Multimodal Facial Gender and Ethnicity Identification", Advances in Biometrics: International Conference, Hong Kong, China, 2006, pp. 554-561.

Monrose, F. et al. "Password hardening based on keystroke dynamics," Proceedings of sixth ACM Confernece on computer and Communications Security, CCCS 1999.

Obaidat, M.S. and Sadoun, B. "Keystrok Dynamics based Identification," Biometrics: Personal Identification in Networked Society; Anil Jain et al, editors. Kluwer, MA. 1998.

Pusara, M. and Brodley, C.E., "User ReAuthentication via Mouse Movements" In Proceedings of the 2004 ACM Workshop on Visualization and Data Mining for Computer Security, ACM, New York, NY, pp. 1-8.

Sato, Y. and Kogure, K. "On-line Signature Verification. Based on Shape, Motion, and Writing Pressure", Proc. 6th Int. Conf. on Pattern Recognition, pp. 823-826, 1982.

Yun, M.H. et al. "Classification of Bluffing Behavior and Affective Attitude from Prefrontal Surface Encephalogram During On-Line Game" Advances in Biometrics: International Conference, Hong Kong, China, 2006, pp. 562-570.

Zhang, S. et al.; "Continuous Verification Using Mutlimodal Biometrics" Advances in Biometrics: International Conference, Hong Kong, China, 2006, pp. 562-570.

* cited by examiner

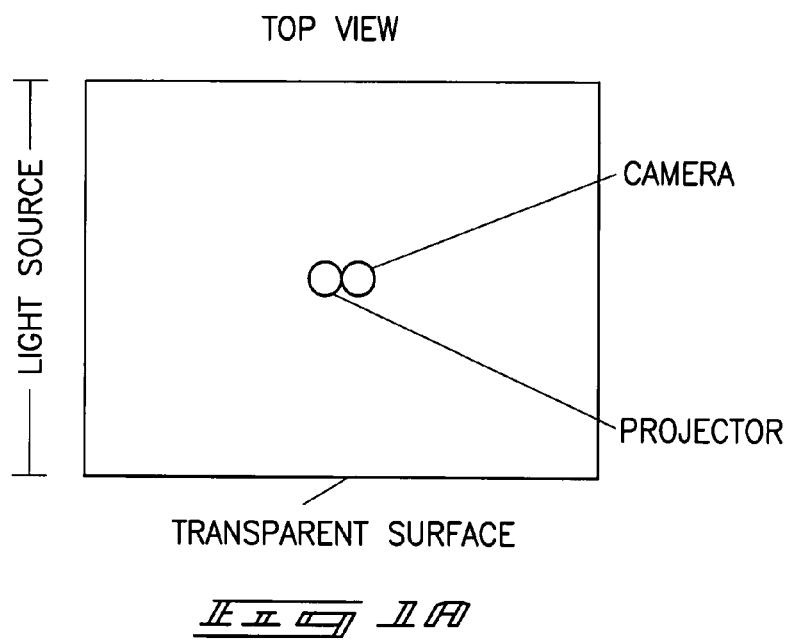
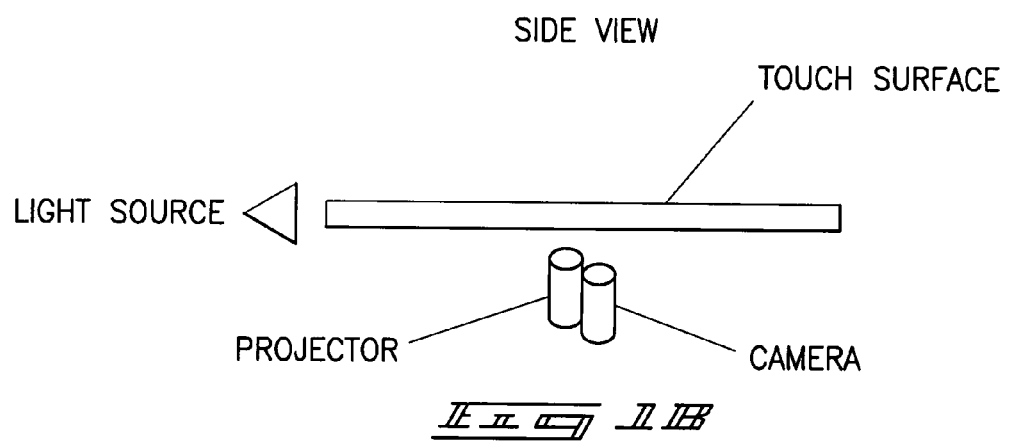

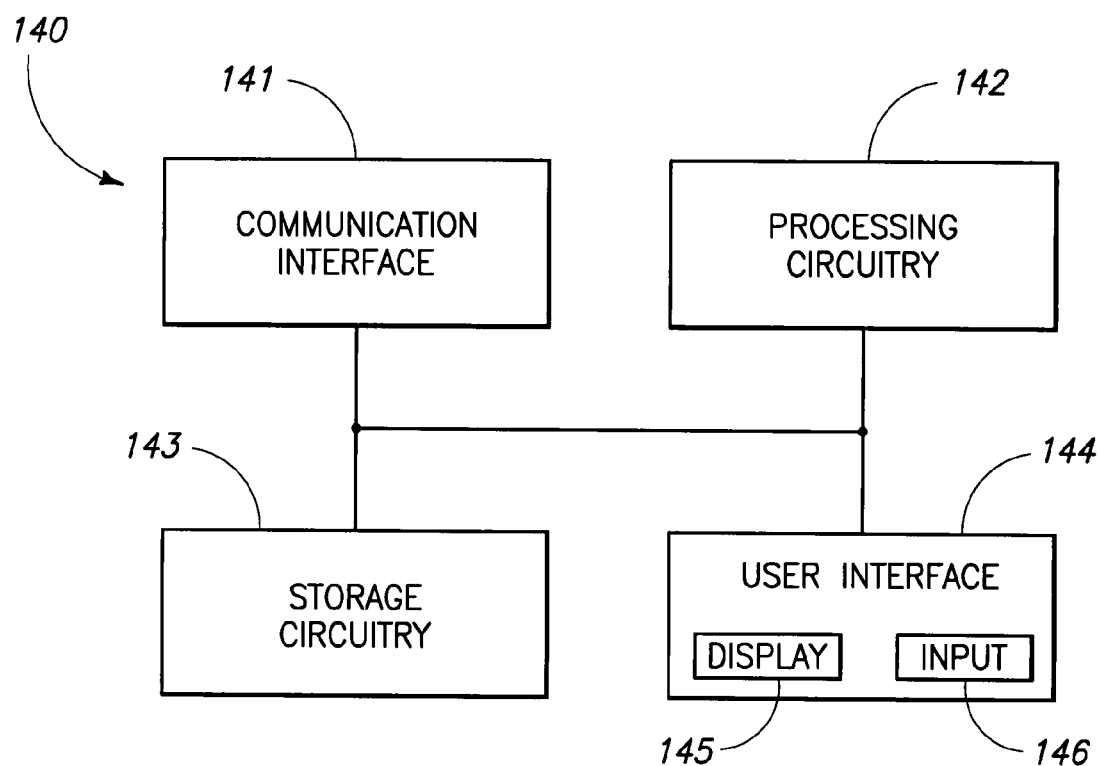

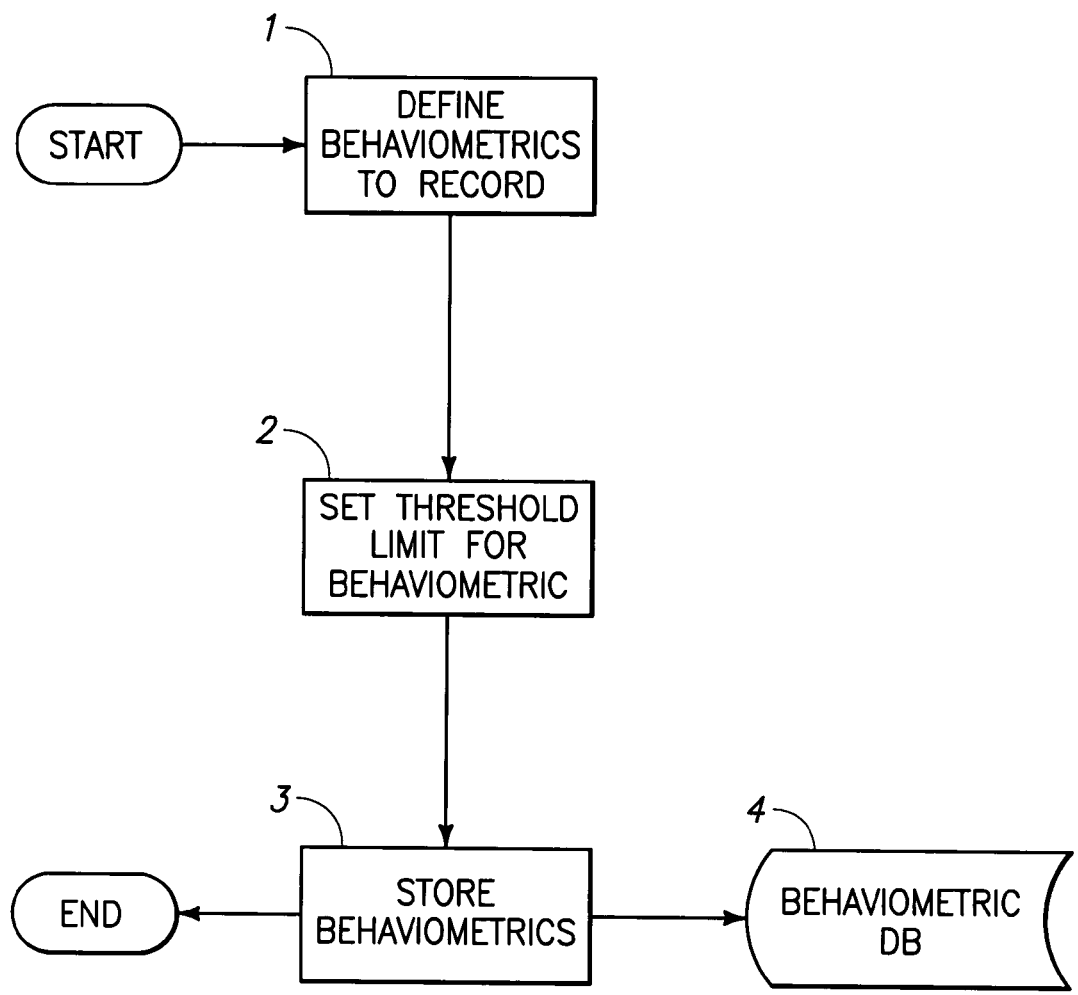

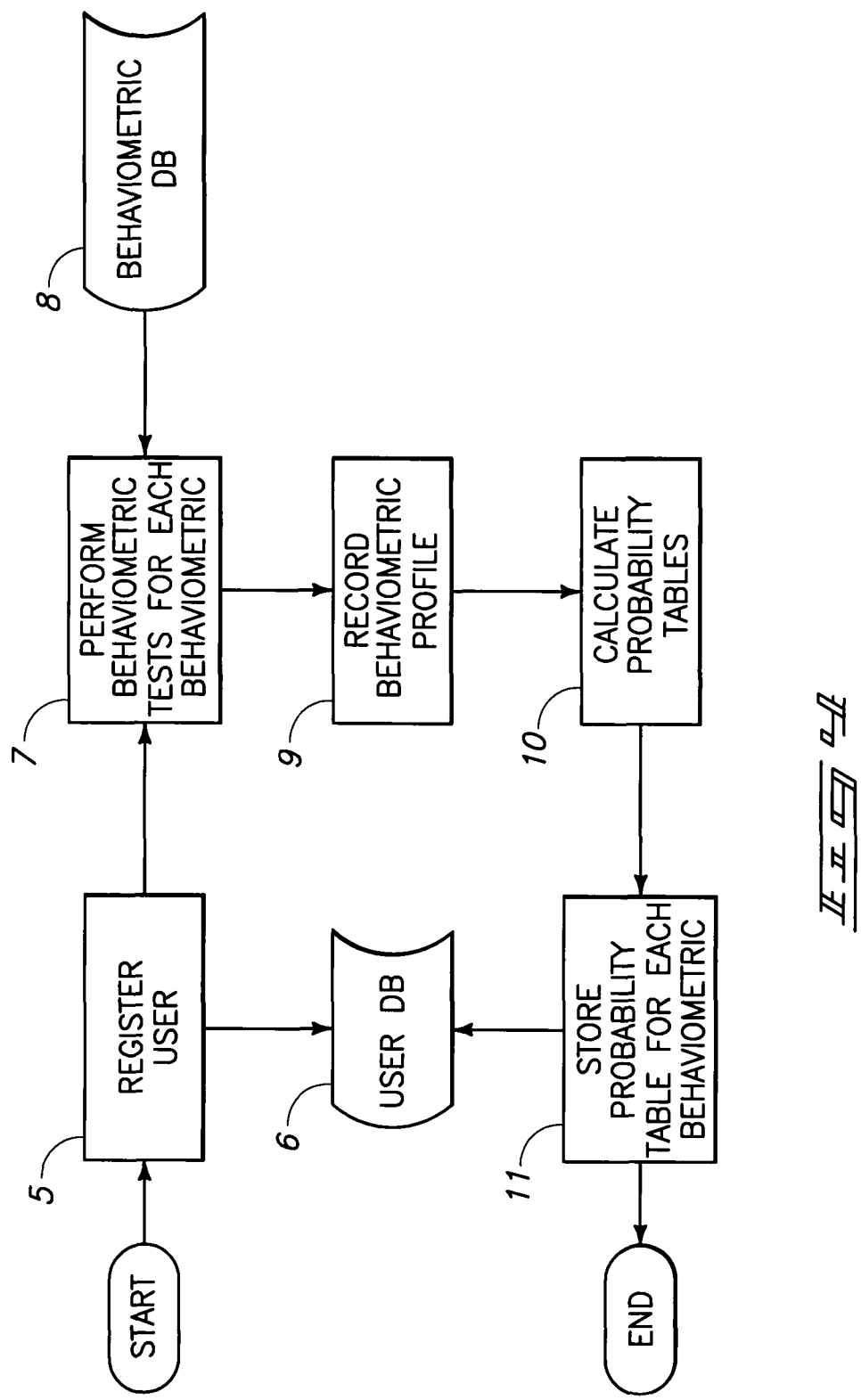

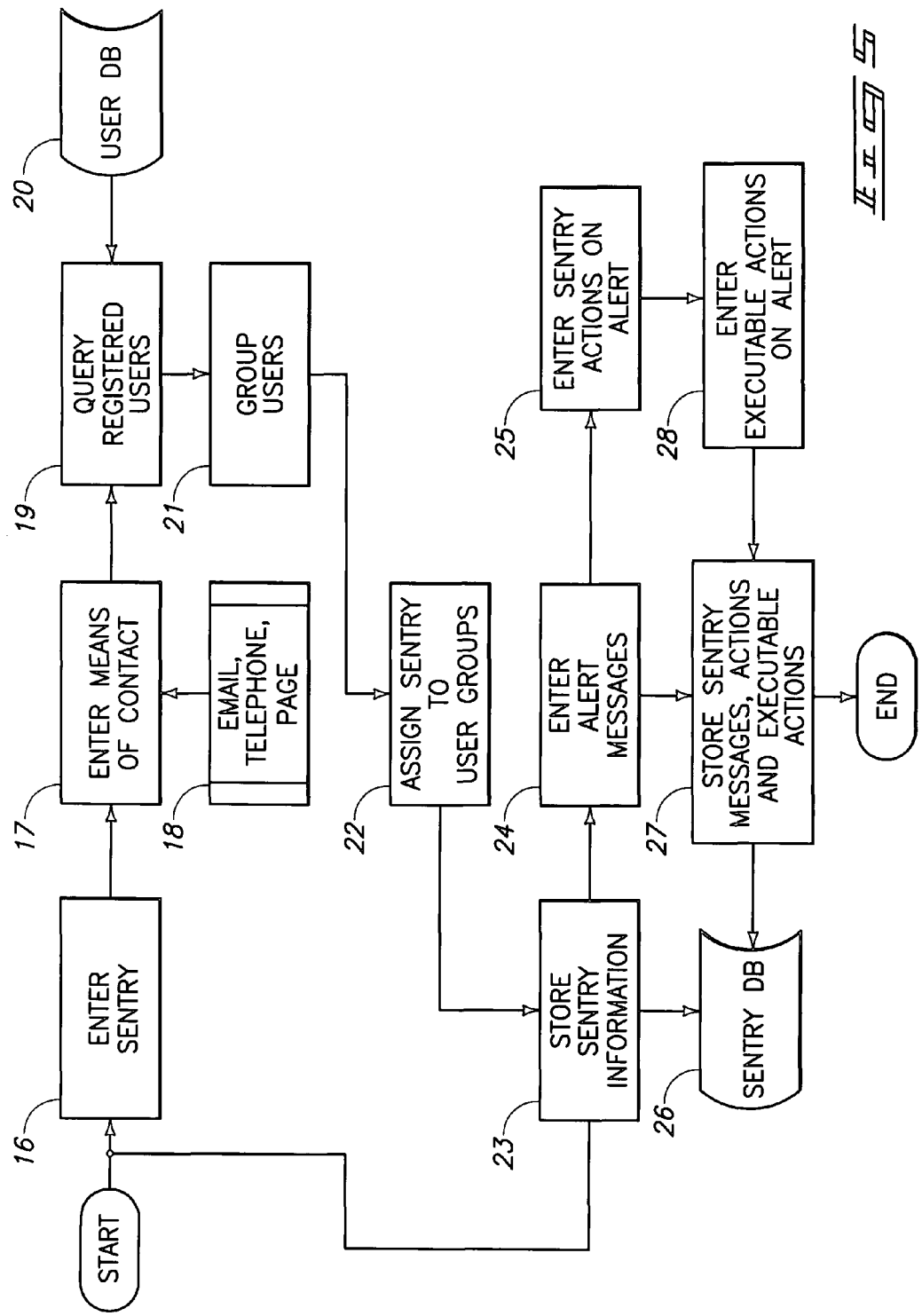

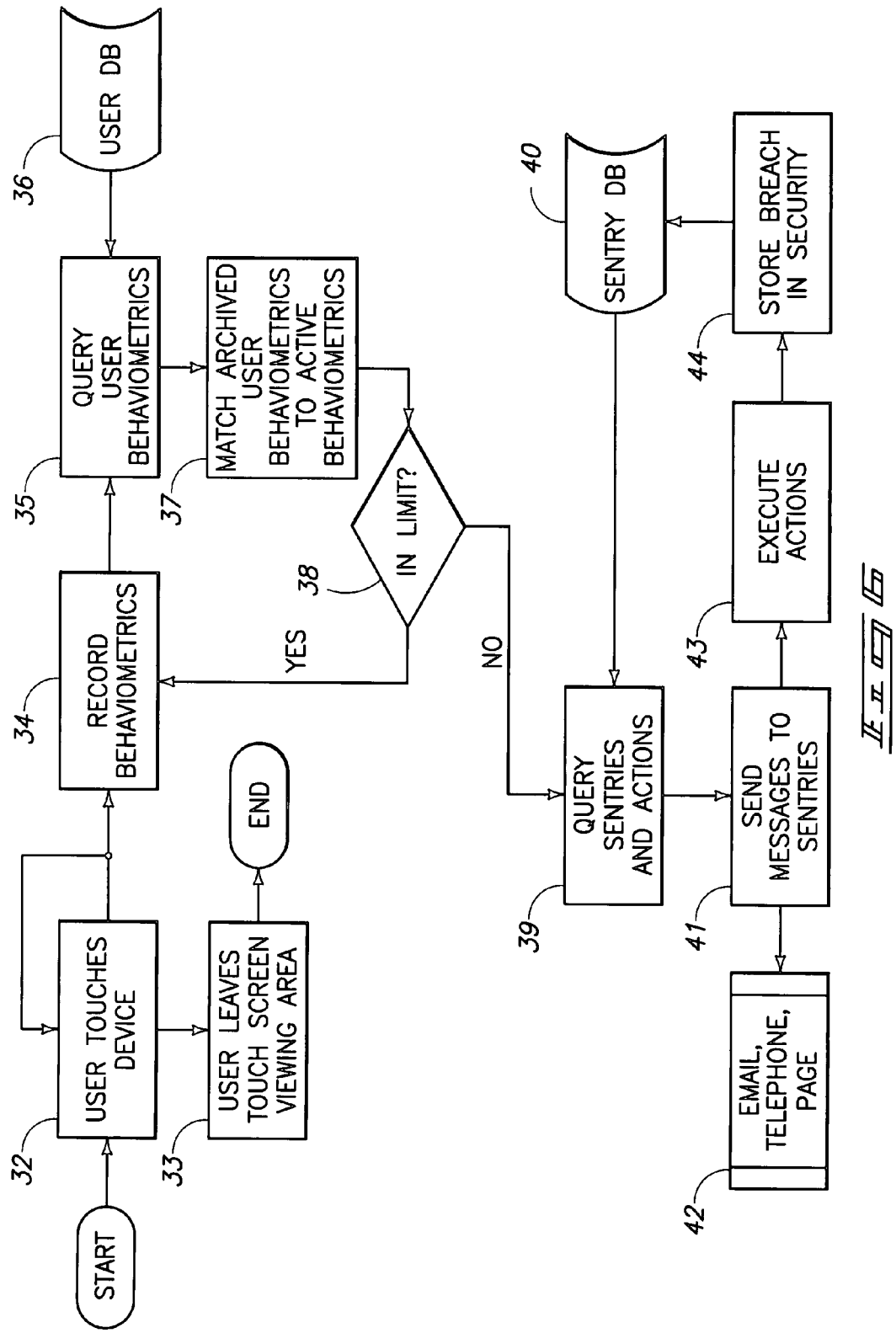

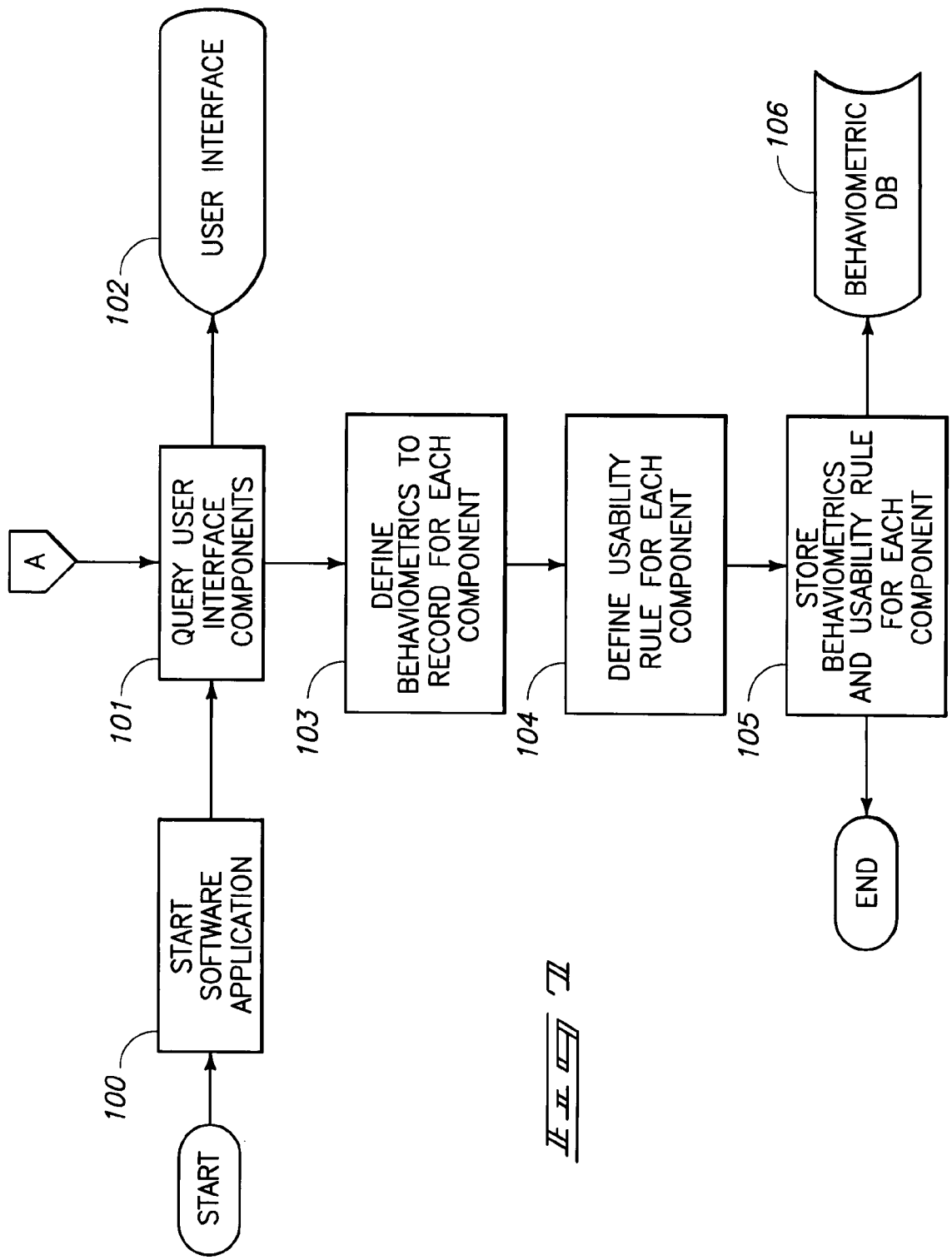

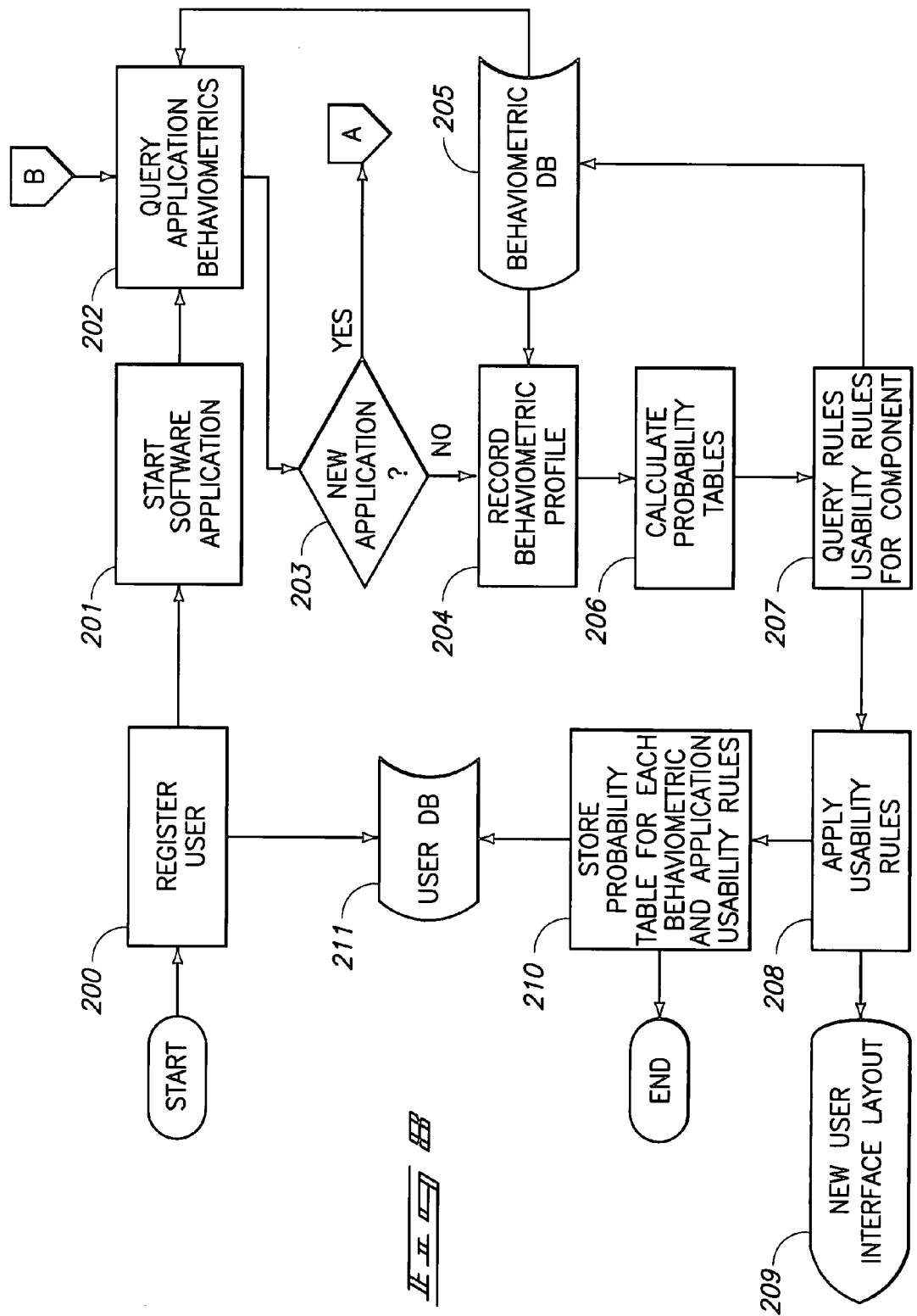

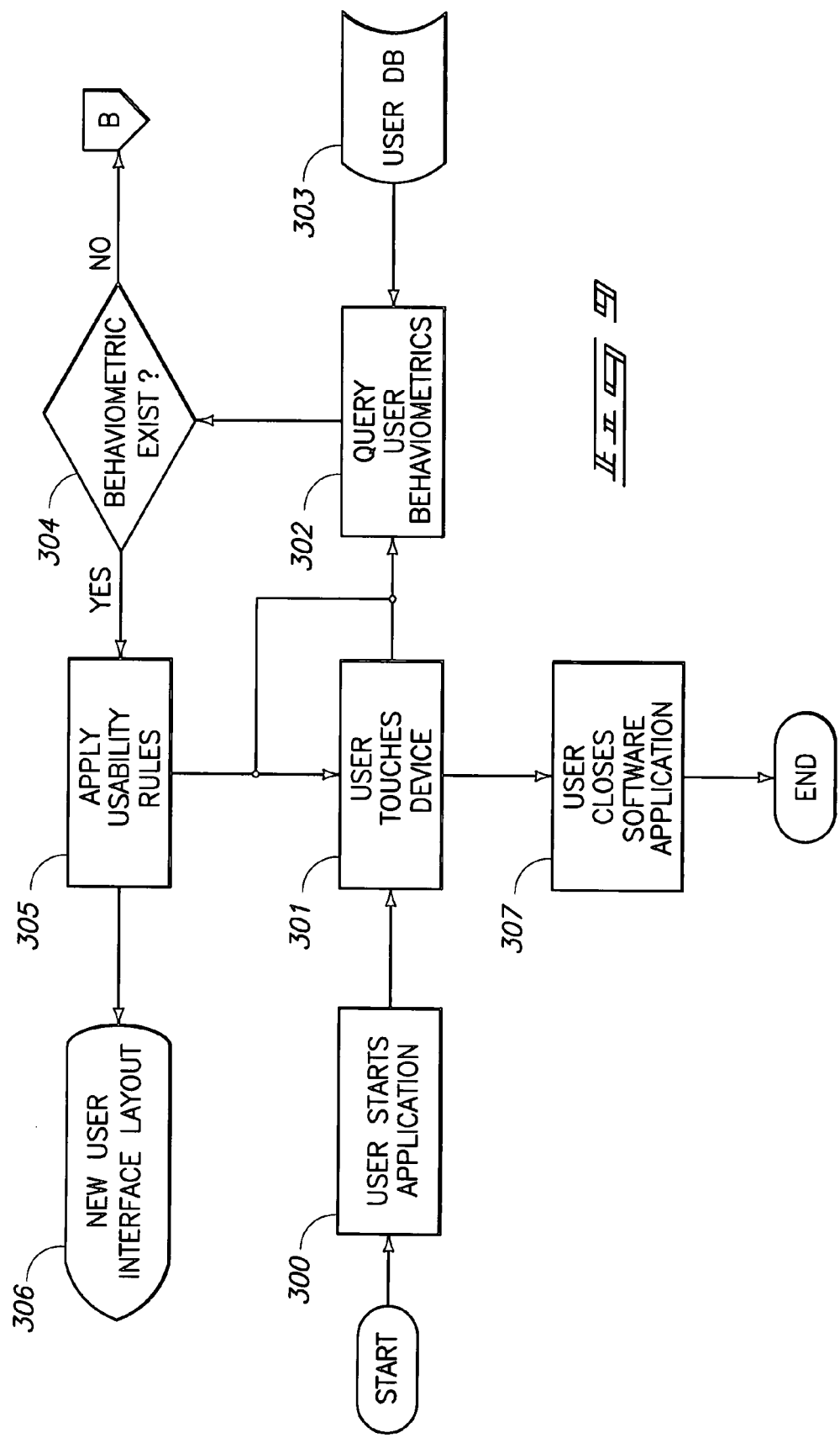

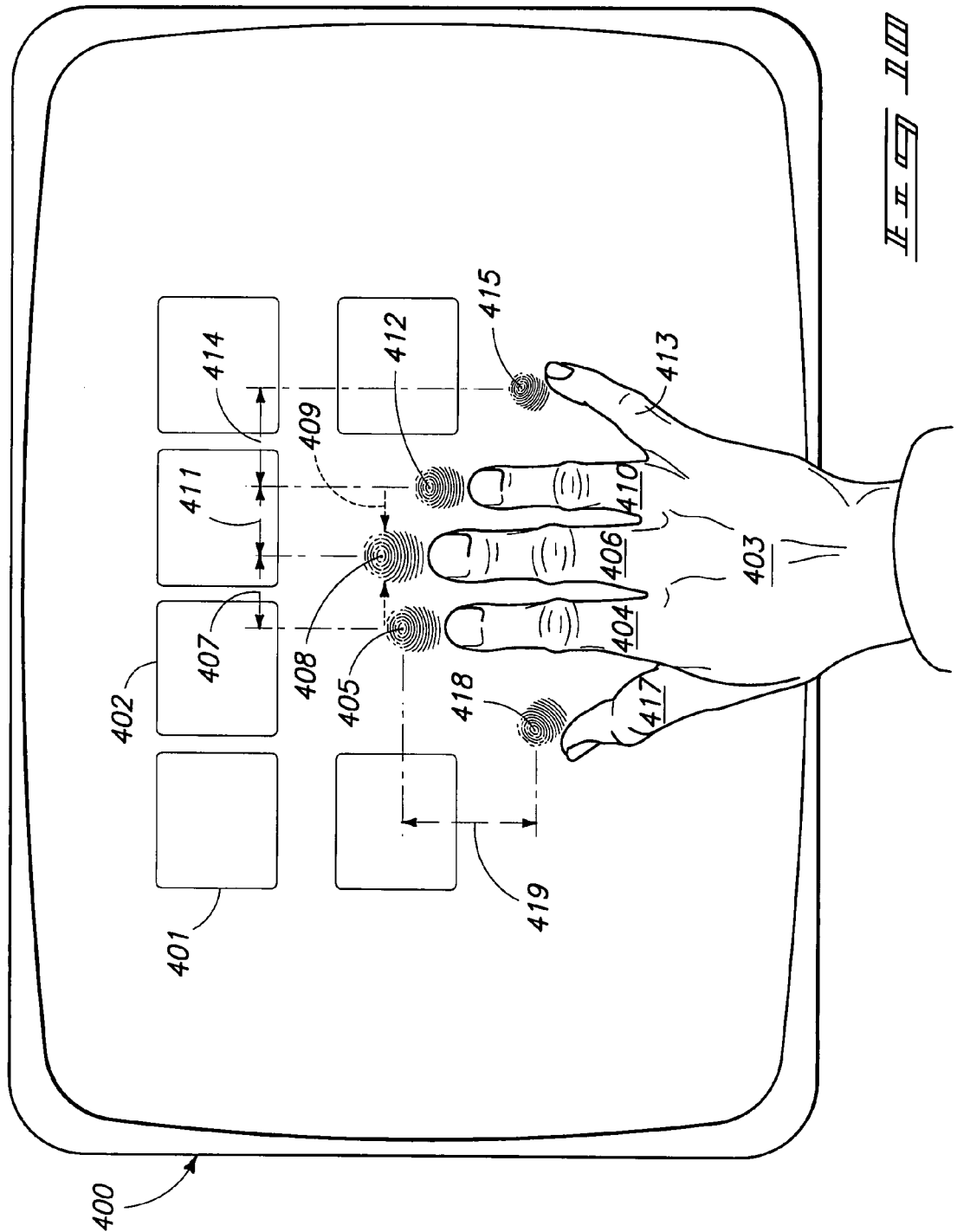

SYSTEM AND METHOD FOR USER AUTHENTICATION AND DYNAMIC USABILITY OF TOUCH-SCREEN DEVICES

CROSS REFERENCE TO RELATED APPLICATION

This application claims priority from the following applications:
(1) U.S. provisional patent application No. 60/844,917 filed Sep. 15, 2006, confirmation No. 2362, entitled "Apparatus and Method for tracking real time user identity via a frustrated total internal reflection multi-touch user interface" by inventors Herbert Lewis Alward, Coeur d' Alene, ID, Timothy Erickson Meehan, Richland, Wash., James Joseph Straub III, Coeur d' Alene, ID, and Robert Michael Hust, Hayden, ID; and
(2) U.S. provisional patent application No. 60/846,690, filed Sep. 22, 2006, confirmation No. 2322, entitled "Apparatus and Method for generating the dynamic usability for software applications using a frustrated total internal reflection multi-touch user interface" by inventors Herbert Lewis Alward, Coeur d' Alene, ID, Norman Carr, West Richland, and Timothy Erickson Meehan, Richland, Wash. The above-referenced US provisional patent applications are hereby incorporated herein by this reference as though fully set forth herein, including specification and drawings.

TECHNICAL FIELD

This invention relates to a user authentication system and dynamic usability for tracking the behaviormetrics of the authorized to establish authentication and dynamic usability for multi-touch devices that serve as user interfaces to a hardware or software system.

BACKGROUND OF THE INVENTION

Many devices and systems use a keyboard or similar terminal as a user interface to access the device or system. Keyboard terminals are generally hardware devices or user interfaces that emulate typewriters, but they are also keypads on cellular telephones, portable devices such as PDA's and touch screen devices, tablet computers, or other devices that use a touch screen for key entry. These types of devices with the user interfaces may for example be a computer or electronic machine that generally requires any type of input such as alphanumeric input, but keyboards are not restricted to having alphanumeric keys. These devices are also single touch devices where user interaction events are recorded sequentially rather than simultaneously. This invention focuses on multi-touch devices as a means to authenticate users and provide dynamics usability to the user interface.

One embodiment of a multi-touch device uses Frustrated Total Internal Reflection (FTIR) to track the user interaction at the interface. FTIR uses the phenomenon when light traveling in a medium internally reflects due to the critical angle of reflection and the index of refraction of the material. Fiber optics and the like use the concept of total internal reflection (TIR) to transmit light with virtually no loss. If an additional material is introduced at the surface, it can frustrate the internal reflection causing light to escape at that point of contact.

Using FTIR, one can construct a multi-touch device where the finger or device touching the interface of a monitor that has internally reflecting light will produce touch events. These touch events can be constructed into user events similar to keystrokes on a keyboard and mouse clicks via a mouse.

Fingerprint scanners use FTIR to determine fingerprints, but this invention focuses on the behaviormetrics of the user interaction due to finger size and tactile motion provided by the user. User events at the Human Computer Interface (HCI) for multi-touch devices can provide a user signature based on the behaviormetrics of the user interaction.

Typically, when accessing these electronic devices some sort of means of authentication is desired or preferred, and a common such authentication is for an authorized user to be assigned a password or PIN (Personal Identification Number) to allow them to access and use of the device. Other types of systems may also desire to require or provide authentication, such as some computer software applications, which may for example require a password to allow an authorized user to enter the application on the computer it resides, or to enter certain more secure portions of the software or data.

While passwords provide some protection, passwords and other unique names such as user names, may also be a vulnerable point of security access due to any one of a number of different factors, such as poor choice of user-defined passwords, stolen passwords, lost passwords or the user exposes the password to an unauthorized party. In response to the vulnerability of passwords, the industry has incorporated secondary devices such as electronic signatures, smart cards, and biometric devices: fingerprint and retinal scanners, etc, thus requiring the user to log into the system via redundant, multiple and/or varied means. An added safeguard in software applications is to force a user to re-enter the access devices at certain intervals or at certain points-of-entry. These devices and mechanisms however can not prevent an unauthorized user from stealing the secondary devices or from preventing a criminal party from forcing the user to enter the password and/or secondary devices at any given time. None of these methods will protect the system, if the authorized user leaves the system without properly logging out of the system, thus leaving the system open to any bystander or passing unauthorized party.

At the interface for a multi-touch device, numerous behaviormetric observations are tracked which provide user identity. These include the size of a user's finger, the pressure they apply to the monitor as the size of the finger reading grows with pressure, a user tap and the duration of the tap, the timing between taps and double taps, the vector of the finger position, entry/exit vectors, gesture recognition, the chording distance of multi-finger touches and the spacing between the chording fingers, the speed of touching motions, top, side and bottom range of touching events due to different length of arms, distance between arms based on different hand positions. All of these tactile behaviormetrics events are unique to a user. The also provide a measurement for enhancing the usability of an application at the multi-touch user interface.

Embodiments of this invention may also provide a way to account for and sense varying data for a specific user, such as for instance a different authorized user profile when the user is engaging in the measurable dynamics or characteristics at different times of the day, length of time the authorized user has been accessing the system, under different stress or fatigue levels, or any one of a number of different ways there can be a measurable and predictable variance in the data.

Identifying and knowing the user of a computer is a desirable aspect of computer and software application security. Computer and software applications maintain different levels of security which have been breached in any one of a number of different ways, such as by stolen passwords, stolen smart cards, means of spoofing biometric devices, etc. If access to the computer is left open by an authorized user, passersby or bystanders then have ready access to the computer or open software application. The computer or software application on a network of devices needs to be able to define accurately the current user of said computer or software application.

This invention provides for the authentication of a user via the multi-touch behavior of the authorized user. Unlike other biometric devices, it is non-intrusive and adaptable to changes in the user's behavior. The multi-touch device dynamics system provided by this invention are relatively scalable through the use of probability distribution representations, which in some examples or embodiments, may provide scales relative to O(1) number of users in calculating the likelihood the user is the authorized user. Other implementations scale to n or $n_2$ number of users. Embodiments of this invention may also provide a means to notify security sentries and execute programmed actions upon a breach in security based on changes in the multi-touch dynamics.

This invention provides an adaptable means for altering the usability of applications at the interface of the multi-touch device based on the user's multi-touch behaviormetric dynamics.

Probability distribution representations may be used in embodiments of this invention to identify if the purported or alleged authorized user is in fact the authorized user. Calculation and/or algorithms may be utilized to calculate the likelihood the alleged authorized user is the legitimate authorized user who has been authorized to access the system, account or device. The probability distribution representations provide a fast, adaptable and scalable mechanism for discerning legitimate users from illegitimate users. Embodiments of this invention may also provide a system to provide security alerts to, or notify, sentries when the system determines that it may be probable that the new or purported authorized user may not in fact be the authorized user. In some aspects of this invention, the security notification mechanism may provide a more proactive notification and security system to better secure the system to which it is being applied.

Probability distribution representations may be used in embodiments of this invention to identify usability parameters for the determining the size and position of application actions at the user interface.

It is an object of some embodiments of this invention to provide a more scalable system for verifying the identity of an identified user or user group or class of users for multi-touch devices.

It is also an object of some embodiments of this invention to provide a system for determining which of a plurality of identifying data point provide better identification of an identified user, user group or class of users for multi-touch devices.

While the invention was motivated in addressing some objectives, it is in no way so limited. The invention is only limited by the accompanying claims as literally worded, without interpretative or other limiting reference to the specification, and in accordance with the doctrine of equivalents.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 1a is a top view of a multi-touch device using FTIR as the means to record user multi-touch events;

FIG. 1b is a side view of a multi-touch device using FTIR as the means to record user multi-touch events;

FIG. 2 is a block diagram of an exemplary data processing apparatus;

FIG. 3 is an exemplary flowchart illustrating one embodiment of this invention wherein a sequence of logical steps are shown which define the behaviormetric measurements to be recorded for the multi-touch device;

FIG. 4 is an exemplary flowchart illustrating an embodiment of this invention wherein the sequence of steps employed to record the behaviormetric measurements of a user;

FIG. 5 is an exemplary flowchart illustrating an embodiment of this invention wherein the sequence of steps employed to configure the system for alerts when there is a breach in user security;

FIG. 6 is an exemplary flowchart illustrating an embodiment of this invention wherein the sequence of steps employed to configure a system to compare multi-touch dynamics of a purported authorized user to the authorized user probability distribution representation, notifying the proper sentries of a probability as to whether the purported authorized user is the authorized user;

FIG. 7 is an exemplary flowchart illustrating an embodiment of this invention wherein the sequence of steps employed to define the behaviormetrics to be recorded and the usability rules based on those behaviormetrics for user interface components of an application at the multi-touch interface;

FIG. 8 is an exemplary flowchart illustrating an embodiment of this invention wherein the sequence of steps employed to record the users' behaviormetrics at the multi-touch screen and applying the usability rules assigned to the behaviormetrics for each user interface component;

FIG. 9 is an exemplary flowchart illustrating an embodiment of this invention wherein the sequence of steps employed to apply the usability rules based on the user's behaviormetrics to a user interface of a software application FIG. 10 is an elevation view of an example of at least some measurable data present in a hand interface with a multi-touch screen interaction which embodiments of this invention may be used in combination with; and FIG. 11 is an elevation view of an exemplary hand and finger movement relative to a multi-touch screen which embodiments of this invention may be used in combination with.

DETAILED DESCRIPTION OF THE PREFERRED EMBODIMENTS

Figure 11:
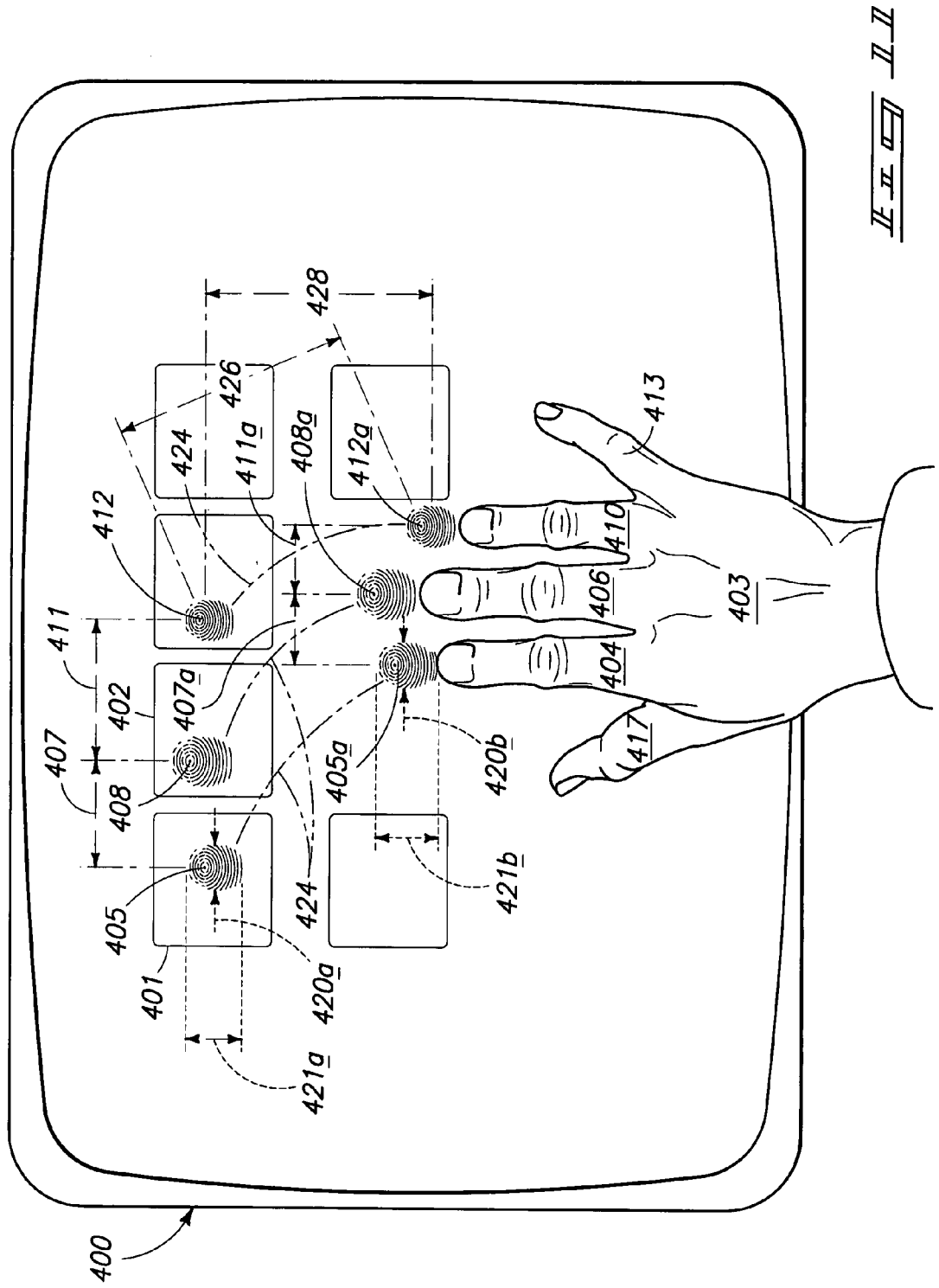

The term "data" as used herein may be any individual or group of data, data points or items, from any one of a number of sources and may be any one of a number of different types of data. Data for example may be a sensed data or grouping of individual data points or data, or a measurement of most anything that can be measured, preferably related to behavior or distinguishing characteristics. Some examples of data may include information, parameters, keystroke dynamics, X-Y device dynamics, events, characteristics, facial movement, eye movement, facial profile, data points, groups of data points or characteristics, inputs, signals, etc.

When the phrase accessing is used in connection with accessing data or accessing characteristics or accessing other items, it is not limited to accessing data or information from outside the processor, but instead would include all such items accessed within the data processing apparatus or system, or external.

It will also be appreciated by those of ordinary skill in the art that data may also be a grouping or combination of any of the foregoing. As one example, data points from finger tapping dynamics from a user may be measured for example for a series of touches such as successive or simultaneous touches on a touch screen.

In some aspects of this invention, data is obtained by taking measurements from touch characteristics of the users, for example measuring the speed at which a user moves their fingers across a touch screen, or an anatomical trait of the user (anonymous or known use) such as the size of the fingerprint, finger spacing, left and right hand spacing, reach of touch on the touch screen, or arm length. Another example may be wherein data such as the pressure which a user asserts on a tablet computer user interface (e.g. a screen), which in some examples includes sensing pressure on a scale of zero to fifty-six.

The term "probability distribution representation" may be a behavioral record which may, but need not be, related to frequency of an identified behavior, component of behavior, measurement of behavior or other data point. It will be recognized by those of ordinary skill in the art that these tables may come in numerous shapes, forms, configurations, scales and may include singular measurements, groupings of measurements, groupings of data or any other individual data or data points or items, which may provide identifying information for comparison, or for distinguishing a particular identified or authorized user. Examples of probability distribution representations may be probability tables, histograms, bar graphs, frequency record, event count, profile, record, lookup tables, probability lookup tables, behavioral profiles, bar graphs, distribution functions, or others, all within the contemplation of this invention. There may be different ways to visually represent a probability distribution representation, such as more as a bar chart, curve, smoothed curve, series of data points represented graphically, a histogram or others, with no one in particular being required to practice this invention. Known techniques may be utilized to create or smooth or alter the curve and/or data representation.

When the term authentication is used herein it may be broader than its traditional definition in that it may refer at least in part to identify, identification, authorizing, authenticating, labeling, associating, or fingerprinting the data to an identified or authorized user for any one of a number of different purposes. Examples of purposes for which authentication is desired may be authenticating that the person possessing a password and entering into an online account is the person or authorized user whose profile is recorded and the person that is authorized to enter that count. For instance if finger spacing data provides the preferred, chosen or identifying measurable or ascertainable data, then a comparison of the users finger spacing dynamics to the probability distribution representations for that user in the global probability distribution representations for finger spacing would be compared in order to verify a probability that the purported or alleged authorized user is the identified user or authorized user.

When the term or phrase "authorized user" is used herein, it means not only a single user, but may also include a class, group or demographic of users all within the meaning of the phrase "identified user". For example, it may include persons within an accounting group at a corporation who have access to a computer or electronic system or network; or it may include a group of people classified together because they are all left-handed, wherein this invention is not limited to any one in particular.

The term global in relation to a probability distribution reference or references may also be referred to as a wide population reference, for which there is no particular number or quantity of data points blended, but which will depend upon the circumstances. In most if not all cases the wide population data will include more than a sample of one since the one data point would be from the current purported authorized user.

Embodiments of this invention are methods and apparatus configured to receive, which may in some examples mean a system is configured to receive, collect, capture, sense or parse data, and then to process or utilize said data as further described herein.

Embodiments of this invention may provide a desired advantage of being more scalable than other systems, in that substantial or even massive amounts of data, characteristics, information or other measurable input data may be incorporated into one or more probability distribution representations or histograms to provide a single or a small number of probability distribution representations against which to compare the new information with. This means that massive information such as gathered over the World Wide Web or Internet may be distilled into one or relatively few probability distribution representations against which the data can be quickly compared to determine if it is more probable than not that the purported authorized user, is in fact the authorized user. The system designer adapting embodiments of this invention to a given application will have many options in determining what type of probability distribution representation to construct, the data to best distinguish the distinguishing characteristic, and further in defining the universe of data that may be combined to comprise the probability distribution representation, to optimize the ability to distinguish a user, or to authenticate the authorized user.

Embodiments of this invention may but need not necessarily include an adaptive, scalable method to acquire a behavioral signature for a user of a system who utilizes a touch screen. These embodiments of this invention may for instance accomplish this by tracking the touch patterns made by the user or measuring the finger size of the user. These touch patterns dynamic pattern and finger size become a signature for the user and can be used to determine if the user at the touch screen is the same user registered as the current user via other electronic means such as a password or smart card, etc. The system defines the means to record the pattern, track the users at the touch screen and notify proper authorities when the user at the touchscreen is determined to be different than the user who is registered as the active user at the touchscreen.

As fingerprints identify individual people, so do finger actions on a touchscreen user interface. The spacing of fingers during multi-touch events, the pressure applied and the timing between tapping events, all contribute to defining a signature for each individual user. Touchscreen devices may render an identifiable signature related to the touching of the screen.

Embodiments of this invention may therefor include the establishment of measurements and places probability profiles on the touch actions of users. The measurements may pertain to and are not restricted to the finger tapping timing, finger pressure, size of finger, finger spacing, spacing between right and left hands and arm length.

To establish the probability profile of a user, the system captures the touchscreen events. Table 1 illustrates an example event table for the spacing between successive fingers on the right hand to measure chord tapping when a number of fingers touch the screen simultaneously. The spacing is measured from the center of the left most finger to the center of the right most finger. The allowed values may for instance in aspects of this invention range from 0 mm to 250 mm.

TABLE 1

Finger spacing event frequencies for successive fingers in chord events for User 1. Fingers 1, 2, 3, 4 represent the index finger, middle finger, ring finger and the little finger, respectively.

| User 1 | Spacing (millimeters) | | | | | | |
|---|---|---|---|---|---|---|---|
| Finger Chord | 0 | ... | 10 | 11 | ... | 50 | ... | 250 |
| 1-2 | 0 | ... | 25 | 28 | ... | 2 | ... | 0 |
| 1-2-3 | 0 | ... | 1 | 2 | ... | 25 | ... | 0 |
| 1-2-3-4 | 0 | ... | 0 | 0 | ... | 36 | ... | 5 |
| 2-3 | 0 | ... | 21 | 28 | ... | 6 | ... | 0 |

Once the system sufficiently captures the user event measurements, the system calculates the user probability table by applying a general kernel function, $K_h(x)$, which smoothes the measured data into a density estimator, given by $K_h(x)=1/h\ K(x/h)$, where h=bandwidth and K=Uniform, Triangle, Quartic, Gaussian, Cosinus, or etc. kernel function.

The parameter, h, determines the smoothness of the estimation. When h→0, the kernel estimation is less smooth, and when h→∞, the kernel estimation is very smooth. The kernel function, K, can be any kernel estimation function where the ∫K(x)dx=1. Table 2 illustrates the calculation of the likelihood for each finger chord event. Once trained for a user, when a finger chord event occurs, the system returns the likelihood value for that event as if made by the alleged user.

TABLE 2

User probability distribution representation for the finger spacing on chord events for User 1.

| User 1 | Spacing (millimeters) | | | | | | |
|---|---|---|---|---|---|---|---|
| Finger Chord | 0 | ... | 10 | 11 | ... | 50 | ... | 250 |
| 1-2 | 0.0 | ... | 0.15 | 0.16 | ... | 0.01 | ... | 0.0 |
| 1-2-3 | 0.0 | ... | 0.0 | 0.01 | ... | 0.26 | ... | 0.0 |
| 1-2-3-4 | 0.0 | ... | 0.0 | 0.0 | ... | 0.31 | ... | 0.05 |
| 2-3 | 0.0 | ... | 0.17 | 0.19 | ... | 0.02 | ... | 0.0 |

To make the probability distribution representation more adaptive, more parameters and training can be tied to the probability distribution representation, such as time of day or type of application. The size of the user probability needs only to be as large as the human maximum allow for finger, hand and arm movements.

To establish the probability profile for an impostor, the system establishes a global probability distribution representation which stores the probability profile of the other users to determine the probability the typist is an impostor and not the alleged user. As done for the user probability distribution representation, the system captures the users' touch dynamics and stores the timing and frequency of events. The results are smoothed using a general kernel function to establish a kernel density estimator. The estimator calculates the likelihood that the user belongs in the global set of users versus the user profile. As in Tables 1 and 2, similar tables are constructed for the global probability distribution representation as illustrated in Tables 3 and 4.

TABLE 3

Finger spacing event frequencies for successive fingers in chord events for the global population of users. Fingers 1, 2, 3, 4 represent the index finger, middle finger, ring finger and the little finger, respectively.

| Global | Spacing (millimeters) | | | | | | |
|---|---|---|---|---|---|---|---|
| Finger Chord | 0 | ... | 10 | 11 | ... | 50 | ... | 250 |
| 1-2 | 0 | ... | 102 | 95 | ... | 20 | ... | 0 |
| 1-2-3 | 0 | ... | 14 | 19 | ... | 114 | ... | 0 |
| 1-2-3-4 | 0 | ... | 0 | 0 | ... | 210 | ... | 46 |
| 2-3 | 0 | ... | 57 | 76 | ... | 12 | ... | 0 |

TABLE 4

Global Probability distribution representation.
Finger spacing event frequencies for successive fingers in chord events for the global population of users. Fingers 1, 2, 3, 4 represent the index finger, middle finger, ring finger and the little finger, respectively.

| Global | Spacing (millimeters) | | | | | | |
|---|---|---|---|---|---|---|---|
| Finger Chord | 0 | ... | 10 | 11 | ... | 50 | ... | 250 |
| 1-2 | 0.0 | ... | 0.15 | 0.16 | ... | 0.01 | ... | 0.0 |
| 1-2-3 | 0.0 | ... | 0.0 | 0.01 | ... | 0.26 | ... | 0.0 |
| 1-2-3-4 | 0.0 | ... | 0.0 | 0.0 | ... | 0.31 | ... | 0.05 |
| 2-3 | 0.0 | ... | 0.17 | 0.19 | ... | 0.02 | ... | 0.0 |

With both the user probability distribution representation and the global probability distribution representation, the system applies Bayes' Rule to determine a posterior probability the observed user is the alleged user. The posterior probability that the observed user is the alleged user, P(A|O), is given by:

$$P(A|O)=P(A)*L/((P(A)*L)+1-P(A)),$$

where P(A) is the prior probability the user is the alleged User And L is the likelihood ratio. The likelihood ratio is given by P(O|A)/P(O|I), where P(O|A) is the probability the alleged user produced the observations and P(O|I) is the probability an impostor produced the observations. Based on the threshold set for the value of P(A|O), the system logs out the user or notifies a security sentry of a potential breach in security.

Determining the user signature via touchscreen dynamics provides one possible way for establishing a system to monitor the identity of users throughout a network of electronic devices in real time. The system to monitor user identities stores the user touchscreen dynamics patterns and compares the stored user touchscreen dynamics with the registered user purported to be using the touchscreen thereby providing a probability the purported user is the authorized user. The sentries of the identities establish the lower limit of the probability they find acceptable for each user. Once the probability of an identity falls below this limit, the system notifies the sentries and executes any predefined actions that it can machine execute through automated scripts or software applications.

One possible way to make a software application user interface more usable to a user is to track the touchscreen dynamics of the user. Since the arm length, hand size and finger spacing are measured as the user interacts with the touchscreen device (the user's anatomical or physical related data), the placement for user interface components within a software application can be made to coincide with those physical measurements to provide a more ergonomic and quicker software application user interface.

Better usability with user interfaces has been achieved through the use of Fitts' Law which yields a quantitative measure of human motor behavior given by $$MT = a + b \log 2(D/W)$$

where
MT is movement time.
a and b are empirical constants, and can be determined by fitting a straight line to measured data.
D is the distance from the starting point to the center of the target
W is the width of the target measured along the axis of motion. W can also be thought of as the allowed error tolerance in the final position, since the final point of the motion must fall within ±W/2 of the target's centre.

This equation yields a speed-accuracy tradeoff where a longer distance or smaller width of target will produce a longer movement time. The targets can encompass user interface buttons, sliders, entry boxes, and keys to name a few. Although Fitts' Law is referred to herein and may be utilized in practicing embodiments of this invention, it should be noted that no one particular formula, law or algorithm is required to practice this invention, but instead others may be utilized in different embodiments of this invention with no one in particular being required.

Embodiments of this invention define a system which senses data for or characteristics of a user of a system, generally from that user's characteristic use of touch dynamics at a touchscreen device by tracking data or characteristics of the pattern of touch dynamics. The touch dynamics can be used to generate best distance and width values for user interface components of a software application to make such an application more usable to the user and provide better user performance.

The patterns of touch dynamics created by a user are unique to the user due to the user's length of fingers, hand size, length of arm and spacing between appendages. The method measures the pattern by recording the user interaction at the touch screen.

Determining the user motor patterns via touch dynamics provides a means for establishing a system to automatically generate more user interfaces that are unique and more usable to individual users. The system to monitor user more patterns stores the user touch dynamics patterns and applies Fitts' Law to construct the layout of user interface components: both position and size.

To establish the user motor probability profiles, measurements are made on the touch dynamics. Table 5 is an exemplary table of measurements for recording the size of a finger touch for User 1. As the user's finger presses against the screen, the finger width will increase in size until a maximum is reached. Each time a finger touches the screen the size of finger tap is recorded. Table 6 uses the measurement of the gap between two fingers when the user taps two fingers on a touchscreen device. Each time two fingers are tapped simultaneously on the screen, the size of the gap between the fingers is recorded.

TABLE 5

Recording the size of finger taps for a user.

| | Size (millimeters) | | | | | | |
|---|---|---|---|---|---|---|---|
| User 1 | 0 | 1 | 2 | 3 | 4 | 5 | ... 15 |
| Finger Touch | 0 | 0 | 9 | 10 | 17 | 18 | ... 0 |

TABLE 6

Recording the gap between two fingers that touch a touchscreen simultaneously. Fingers 1, 2, 3, 4 represent the index finger, middle finger, ring finger and the little finger, respectively.

| User 1 | Gap (millimeters) | | | | | | |
|---|---|---|---|---|---|---|---|
| Fingers | 0 | 1 | ... | 10 | ... | 20 | ... 50 |
| 1-2 | 0 | 14 | ... | 19 | ... | 15 | ... 0 |
| 2-3 | 0 | 0 | ... | 34 | ... | 32 | ... 0 |
| 3-4 | 0 | 0 | ... | 28 | ... | 35 | ... 0 |

Once the system sufficiently captures the user event measurements, the system calculates the user probability table by applying a general kernel function, $K_h(x)$, which smoothes the measured data into a density estimator, given by
$K_h(x) = 1/h\ K(x/h)$, where h=bandwidth and
K=Uniform, Triangle, Quartic, Gaussian, Cosinus, or etc. kernel function.

The parameter, h, determines the smoothness of the estimation. When $h \to 0$, the kernel estimation is less smooth, and when $h \to \infty$, the kernel estimation is very smooth. The kernel function, K, can be any kernel estimation function where the $\int K(x)dx = 1$. Table 7 illustrates the calculation of the likelihood for the finger sizes for the user. Once trained for a user, each size for the finger has a likelihood attached to it. The most likely value can be used to determine the size of a user interface target to maximize W in the Fitts' Law equation. Table 7 illustrates the calculation of the likelihood for the size of the finger touches.

TABLE 7

User Probability distribution representation for finger sizes

| | Size (millimeters) | | | | | | |
|---|---|---|---|---|---|---|---|
| User 1 | 0 | 1 | 2 | 3 | 4 | 5 | ... 15 |
| Finger Touch | 0.0 | 0.0 | 0.16 | 0.17 | 0.20 | 0.21 | ... 0.0 |

To make the probability distribution representation more adaptive, more parameters and training can be tied to the probability distribution representation, such as age. The size of the user probability needs only to be as large as the finger size space for users. A probability distribution for the gap between fingers can be constructed in the same fashion.

With both the user probability distribution representation for finger size and the probability distribution representation for finger gaps, the system may apply a formula, rule or algorithm for example, to determine the best layout for user interface targets with respect to size and position for the user. In this example or embodiment, the optimal size and position can is determined by applying Fitts' Law where the minimum motion time is derived from a short distance and a large W. The finger size distribution yields a table of likely finger sizes, and the largest finger size can be used to set the size of the user interface target. A larger W would start to increase the size of the distance to the target which would increase the motion time. The probability distribution of the finger gaps yields the likelihood of finger spacing. The most likely gap between the fingers can be set the gap between user interface targets.

FIG. 1a is a top view of a frustrated total internal reflection (FTIR) multi-touch screen device. The surface is transparent with a camera and a projector behind the transparent surface. FIG. 1b is a side view of a FTIR multi-touch screen device. A light source beams light through the side of the surface. The light internally reflects within the touch device until the surface is touched. The camera continuously records the viewing area of the surface and the projector projects any images onto the surface for the user to interact with.

FIG. 2 is a block diagram of an exemplary data processing apparatus 140. FIG. 2 illustrates that communications interface 141 is arranged to implement communications of computing device 140 with respect to external devices not shown. For example, communications interface 141 may be arranged to communicate information bi-directionally with respect to computing device 140. Communications interface 141 may be implemented as a network interface card (NIC), serial or parallel connection, USB port, FireWire interface, flash memory interface, floppy disc drive, or any other suitable arrangement for communicating with respect to computing device 140.

In one embodiment, processing circuitry 142 is arranged to process data, control data access and storage, issue commands, and control other desired operations. Processing circuitry 142 may comprise circuitry configured to implement desired programming provided by appropriate media in at least one embodiment. For example, the processing circuitry 142 may be implemented as one or more of a processor and/or other structure configured to execute executable instructions including, for example, software and/or firmware instructions, and/or hardware circuitry. Exemplary embodiments of processing circuitry include gloom hardware logic, PGA, FPGA, ASIC, state machines, and/or other structures alone or in combination with a processor. The storage circuitry 143 is configured to store programming such as executable code or instructions (e.g., software and/or firmware), electronic data, databases, or other digital information and may include processor-usable media. Processor-usable media may be embodied in any computer program, product(s), or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy disk yet, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 143 described above and/or communicated via a network or other transmission media and configured to control appropriate processing circuitry 142. For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet and/or a private network), a wired in electrical connection, optical connection and/or electromagnetic energy, for example, via a communications interface 141, or provided using other appropriate communication structure or medium. Exemplary programming including processor-usable code may be communicated as a data signal embodied in a carrier wave in but one example.

User interface 144 is configured to interact with a user including conveying data to a user (e.g., displaying data for observation by the user, audibly communicating data to a user, etc.) as well as receiving input from the user (e.g., tactile input, voice instruction, etc.). Accordingly, in one exemplary embodiment, the user interface may include a display 145 (e.g., cathode ray tube, LCD, etc.) configured to detect visual information as well as a keyboard, mouse, touch pad, and/or other input device 146. Any other suitable apparatus for interacting with a user may also be utilized, including three-dimensional interfaces which instead of merely being on an X-Y plane may include three dimensions, namely X, Y and Z.

FIG. 3 is an exemplary flowchart illustrating one embodiment of this invention wherein a sequence of logical steps are shown to configure the recorded touch behaviormetrics for the system. Touch dynamics include finger sizes, finger spacing, speed of movement, etc. The touch dynamic definitions are entered 1 and a threshold limit 2 is assigned to the behaviormetric since different behaviormetrics can have different ranges of variance. The behaviormetrics and threshold limits are stored 3 in the behaviormetric database 4.

FIG. 4 is an exemplary flowchart illustrating one embodiment of this invention to capture and store user touch dynamics for the purpose of recording an authorized user. The user registers 5 and performs behaviormetrics tests 7 for each behaviormetric touch dynamic stored in the behaviormetric database 8. The system records the behaviormetrics 9 as the user performs the tests and calculates 10 the probability tables for each behaviormetric. The system stores 11 the probability tables for each behaviormetric for each user in the user database 6.

FIG. 5 is an exemplary flowchart illustrating an embodiment of this invention wherein the sequence of steps employed to configure a system to notify the proper sentries of a probability as to whether the purported authorized user is the authorized user based on touch dynamics. The sentry is entered into the system 16, and then the means to contact the sentry are entered 17. The means to contact the sentry 18 can be email, text messaging, telephone, paging, etc. The system queries the registered user 19 from the user database to be identified on multi-touch screen 20. The users are grouped 21, and the sentry is assigned to the group to be the users under the sentry's auspices 22. Once the sentry is configured, the system stores the sentry information 23 into the sentry database 26. Any alert messages 24 and any corrective actions for the sentry or sentries to execute are entered into the system 25. For example, actions to execute could be physically observing the user or turning on a camera to observe the user. Any executable corrective actions for the system to execute are entered as ancillary actions for the sentry 28. System actions, for example, could include logging the user out of the system and preventing re-entry. The system stores all alert messages, sentry corrective actions and executable corrective actions associated with a sentry or sentries 27 into the sentry database 26.

FIG. 6 illustrates the process flow for identifying the users, monitoring any change in the user via the touch dynamics. The authorized user or purported authorized user continually touches the surface the system 32 until they leave the multi-touch device viewing area 33. As the user touches the device, the system records the active touch behaviormetrics 34. The system queries 35 the user database 36 to retrieve the user touch behaviormetrics. The system matches the archived 38 touch behaviormetrics for the purported user. If the user matches does not match the archived behaviormetrics within the defined threshold limit, the system queries 39 the sentry database 40 for the actions associated of a discrepancy in behaviormetrics. The system sends 41 messages 42 to the sentries, executes 43 any actions associated with unknown users, and stores 44 the event of an unknown user into the sentry database 40.

FIG. 7 is an exemplary flowchart illustrating an embodiment of this invention wherein the sequence of steps employed to configure the touch behaviormetrics for the user interface components, such as buttons, sliders, and input boxes, of a software application. The software application is started 100 and the system queries or screen scrapes 101 the application user interface 102 for the type of user interface components 103. The touch behaviormetrics to be monitored for each user interface component are defined 104. Then the usability rules, such as Fitts' Law parameters for each type of touch behaviormetric, are defined for each user interface component 105. The system stores 106 the behaviormetrics to be monitored and the usability rules to be applied into the behaviormetric database 106.

FIG. 8 is an exemplary flowchart illustrating an embodiment of this invention wherein the sequence of steps employed to record the behaviormetrics of a new user and applying the usability rules based on their behaviormetrics. The system registers 200 the user into the user database 211. The user starts a software application 201 and the system queries 202 the behaviormetric database 205 for the touch behaviormetrics to monitor. If the application is new to the system 203, the system returns to FIG. 7 at A to record the touch behaviormetrics to monitor and assign usability rules. Otherwise, the system records the touch behaviormetric profile 204 and calculates the probability tables 206 for each touch behaviormetric. The system queries 207 the behaviormetric database 205 for the usability rules assigned to each touch behaviormetric. The system applies the rules 208 defined for each user interface component and produces a new user interface layout 209. The system stores 210 the user behaviormetrics and usability results into the user database 211.

FIG. 9 is an exemplary flowchart illustrating an embodiment of this invention wherein the sequence of steps employed to apply the usability rules once a user starts a software application where the touch behaviormetrics have been previously recorded. The user starts a software application 300 and touches 302 the multi-touch screen device. The system queries 302 the user database 303 for the behaviormetric profile and usability results associated with the software application. The system applies the usability results 305 to yield a new user interface layout for the software application 306. This continues until the user closes the software application 307. If the behaviormetric profile and usability results do not exist for the software application for the user 304, the system returns to FIG. 8 at B to record the behaviormetrics for the software application for this user.

FIG. 10 is an elevation view of an example of at least some measurable data present in a hand interface with a multi-touch screen interaction which embodiments of this invention may be used in combination with. FIG. 10 illustrates multi-touch screen 400, exemplary selection boxes 401 and 402, hand 403 with index finger 404 which may leave fingerprint 405, middle finger 406 which may leave fingerprint 408 a distance 407 away from index finger fingerprint 405. Ring finger 410 may leave fingerprint 412 a distance 411 away from middle finger fingerprint 408, and little finger 413 which may leave fingerprint 415 distance 414 away from ring finger fingerprint 412. Thumb 417 may leave fingerprint 418 a distance 419 away from index finger fingerprint 405. FIG. 10 further shows the width 409 of middle finger fingerprint 408, which is another data point that may be utilized in a given aspect or embodiment of this invention. While fingerprint data or size data related to a fingerprint may be utilized in embodiments of this invention, fingerprint data is one of other touch imprint data that may be utilized in embodiments of this invention, with no one particular data or measurement being required to practice this invention.

It will be appreciated by those of ordinary skill in the art that the data points or measurements illustrated in FIG. 10 are exemplary only and any one of a number of different other data points may be utilized for authentication purposes, with no one in particular required to practice this invention.

FIG. 11 is an elevation view of an exemplary hand and finger movement relative to a multi-touch screen which embodiments of this invention may be used in combination with. FIG. 11 illustrates multi-touch screen 400, hand 403 with thumb 417, index finger 404, middle finger 406, ring finger 410 and little finger 413. FIG. 11 illustrates data that may be taken in a dynamic application where there is movement of one or more of the fingers over a measured time, with first positions and second positions as shown. FIG. 11 shows index finger first fingerprint position 405, with index finger fingerprint 405 dimensions 420a and 421a, and index finger second fingerprint position 405a with dimensions 420b and 421b. In this case a data may be that fingerprint dimension 421b is larger than fingerprint dimension 421a after the movement shown. FIG. 11 further shows middle finger fingerprint first position 408 a distance 407 from index finger fingerprint first position 405, and middle finger fingerprint second position 408a distance 407a from index finger fingerprint second position 405a. FIG. 11 also shows ring finger fingerprint first position 412 a distance 411 from middle finger fingerprint first position 408, and ring finger fingerprint second position 412a distance 411a from index finger fingerprint second position 411a.

FIG. 11 also shows lines of movement 424 of the fingerprints as the fingers may be moved across the screen, which may contain speed, distance and trajectory data therein, and traveling vertical distance 428 from the first positions to the second positions. It will be noted that the distances and measurements of fingerprint size, spacing, and relative distances may change from a first position to a second position, and those changes or differences may provide authentication data for use in this invention. In some embodiments the width of the target for the human movement modeling may be the width of one or more of the fingerprints, and in others the width of one or more of the paths of the fingerprints from a first position to a second position.

As will be appreciated by those of reasonable skill in the art, there are numerous embodiments to this invention, and variations of elements, steps and system components which may be used, all within the scope of this invention.

One embodiment of this invention for example provides an authorized user authentication method with a frustrated total internal reflection device, comprising: accessing data from an authorized user, said data being touch dynamic data; using the data to create a first characteristic probability distribution representation indicative of the authorized user; accessing new data from a purported authorized user, said new data being touch dynamic data; comparing the new data of the purported authorized user to the first characteristic probability distribution representation for the authorized user; and determining a probability that the purported authorized user is the authorized user based on the comparing.

A further embodiment to the preceding may provide an authorized user authentication method with a frustrated total internal reflection device as recited in the preceding paragraph, and further comprising: accessing the data from the authorized user; using the data to create a second characteristic probability distribution representation indicative of the authorized user; accessing the new data from a purported authorized user; comparing the new data of the purported authorized user to the second characteristic probability distribution representation for the authorized user; and determining a probability that the purported authorized user is the authorized user based on the comparing of the new data to the first characteristic probability distribution representation and to the second characteristic probability distribution representation for the authorized user.

A further embodiment to the one disclosed in the second preceding paragraph may provide an authorized user authentication method with a frustrated total internal reflection device, and further comprising: providing a wide population first characteristic probability distribution representation indicative of the first characteristic of a wide population; comparing the new data of the purported authorized user to the first characteristic probability distribution representation for the authorized user and to the wide population first characteristic probability distribution representation; and determining a probability that the purported authorized user is the authorized user based on the comparing. This embodiment may be further wherein determining the probability that the purported authorized user is the authorized user through the application of Bayes Rule to the new data, the first characteristic probability distribution representation for the authorized user, and the wide population first characteristic probability distribution representation.

In further embodiments of the foregoing, such embodiments may further include applying Fitts Law to determine a first data parameter from the accessing data from the authorized user and further applying Fitts Law to determine a second data parameter from the new data; and/or still further wherein Fitts Law is utilized to determine the first characteristic probability distribution representation for the authorized user, and to determine the wide population first characteristic probability distribution representation, and then applying Fitts Law to the new data to determine the probability that the purported authorized user is the authorized user.

In a further embodiment, a method for determining a more probable authentication method with a frustrated total internal reflection device is provided, comprising: accessing data from an authorized user; using the data to create a first characteristic probability distribution representation indicative of the authorized user; using the data to create a second characteristic probability distribution representation indicative of the authorized user; providing a wide population first characteristic probability distribution representation indicative of the first characteristic of a wide population; providing a wide population second characteristic probability distribution representation indicative of the second characteristic of a wide population; comparing the first characteristic probability distribution representation indicative of the authorized user to the wide population first characteristic probability distribution representation indicative of the first characteristic of a wide population; comparing the second characteristic probability distribution representation indicative of the authorized user to the wide population second characteristic probability distribution representation indicative of the second characteristic of a wide population determining which of the comparings yields a more probable characteristic for authenticating the authorized user from the wide population.

The method disclosed in the embodiment in the preceding paragraph may further comprise: accessing new data from a purported authorized user; and comparing the new data of the purported authorized to probability distribution representations of the more probable characteristic for authenticating the authorized user from the wide population.

The embodiment in the second preceding paragraph may be utilized to further apply Fitt's law to the data to create the first characteristic probability distribution representation indicative of the authorized user; apply Fitt's law to create the second characteristic probability distribution representation indicative of the authorized user; and wherein the wide population first characteristic probability distribution representation indicative of the first characteristic of a wide population, and the wide population second characteristic probability distribution representation indicative of the second characteristic of a wide population, are characteristics from Fitt's Law.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A computerized method for authenticating a user of an electronic system having a touch screen, comprising:
    accessing a data characteristic of a purported authorized user of an electronic system performing a first prescribed interaction with a touch screen;
    accessing a first probability distribution representation for an authorized user indicative of the authorized user performing the interaction with a touch screen;
    accessing a first characteristic probability distribution representation for a wide population performing the first interaction with a touch screen;
    determining a value indicative of whether the purported authorized user is the authorized user, utilizing (a) the first data characteristic of the purported authorized user, (b) the first characteristic probability distribution representation for the authorized user, and (c) the first characteristic probability distribution representation for the wide population; and
    associating the purported authorized user to the authorized user, if the value is above a prescribed threshold.

2. The computerized method for authenticating a user as recited in claim 1, wherein the touch screen is a frustrated total internal reflection (FTIR) device.

3. The computerized method for authenticating a user as recited in claim 1, wherein first data characteristic incorporates a plurality of instances of the purported authorized user performing the first prescribed interaction.

4. The computerized method for authenticating a user as recited in claim 1, further comprising accessing a belief value indicative of a prior belief whether the purported user is the authorized user; wherein, in the determining step, the comparing further includes the belief value.

5. The computerized method for authenticating a user as recited in claim 1, wherein the first interaction is a multi-touch event.

6. The computerized method for authenticating a user as recited in claim 1, wherein the first interaction is a measured event selected from a group including touch movement, touch imprint, touch pressure, multi-touch spacing, and touch sequence.

7. The computerized method for authenticating a user as recited in claim 1, further comprising: providing a user interface layout having components positioned and sized according to usability parameters for the authorized user.

8. The computerized method for authenticating a user as recited in claim 7, wherein the components of the user interface layout are selected from a group including buttons, sliders, and input boxes.

9. The computerized method for authenticating a user as recited in claim 1, further comprising:
- accessing a second data characteristic of the purported authorized user of the electronic system performing a second prescribed interaction with a touch screen;
- accessing a second probability distribution representation for the authorized user performing the second prescribed interaction with a touch screen; and
- accessing a second probability distribution representation for the wide population performing the second prescribed interaction with a touch screen;
- determining a second value indicative of whether the purported authorized user is the authorized user, utilizing (a) the second data characteristic of the purported authorized user, (b) the second probability distribution representation for the authorized user, and (c) the second probability distribution representation for the wide population; and
- wherein the associating step further includes associating the purported authorized user with the authorized user if a total value, based on the first value and the second value, is above a prescribed threshold.

10. The computerized method for authenticating a user as recited in claim 9, wherein the second interaction is a measured event with a touch screen selected from a group including touch movement, touch pressure, touch imprint, multi-touch spacing, and touch sequence.

11. The computerized method for authenticating a user as recited in claim 9, further comprising accessing a belief value indicative of a prior belief whether the purported user is the authorized user; wherein, in the determining step, the comparing further includes the belief value.

12. The computerized method for authenticating a user as recited in claim 9, further comprising: providing a user interface layout having components positioned and sized according to usability parameters for the authorized user.

13. A computerized method for authenticating a user of an electronic system, comprising:
- accessing data characteristic of a purported authorized user of an electronic system based on a plurality of measured interactions with a touch screen;
- accessing a user probability distribution representation for an authorized user based on a plurality of measured interactions with a touch screen;
- accessing a global probability distribution representation for a wide population based on a plurality of measured interactions with a touch screen;
- determining a value indicative of whether the purported authorized user is the authorized user, utilizing (a) the data characteristic of the purported authorized user, (b) the probability distribution representation for the authorized user, and (c) the probability distribution representation for the wide population; and
- associating the purported authorized user to the authorized user for authentication, if the value is above a prescribed threshold.

14. The computerized method for authenticating a user as recited in claim 13, wherein the touch screen is a multi-touch device.

15. The computerized method for authenticating a user as recited in claim 13, further comprising accessing a belief value indicative of a prior belief whether the purported user is the authorized user; wherein, in the determining step, the comparing further includes the belief value.

16. The computerized method for authenticating a user as recited in claim 13, wherein the plurality of interactions include measured events with a touch screen including touch movement, touch imprint, touch pressure, multi-touch spacing, and touch sequence.

17. The computerized method for authenticating a user as recited in claim 13, further comprising: providing a user interface layout having components positioned and sized according to usability parameters for the authorized user.

18. The computerized method for authenticating a user as recited in claim 17, wherein the components of the user interface layout are selected from a group including buttons, sliders, and input boxes.

* * * * *